Patented Mar. 15, 1927.

1,621,186

UNITED STATES PATENT OFFICE.

LEON BARON, OF BROOKLYN, NEW YORK.

BOWEL EVACUANT.

No Drawing.   Application filed November 12, 1926. Serial No. 148,109.

My invention relates to the production of a bowel evacuant.

The object of my invention is the preparation of a bowel evacuant in a concentrated, jelly, syrupy, or semi-liquid state, adapted for rectal injection, without dilution.

More specifically, it is the object of my invention to prepare a bowel evacuant composed of glycerine, ox gall, and in its preferred form, a thickening material or agent, such as gelatine, agar-agar or similar substances, together with a liquid adapted to slightly thin the mixture to a semi-liquid or syrupy state. In the preferred form of my invention the glycerine is present in a predominating quantity and the thickening agent, ox gall and thinning agent in substantially equal proportions.

My invention also has for one of its objects an efficient method of preparing the bowel evacuant so as to disperse the ox gall in the thickening agent.

It has heretofore been proposed to use ox gall in combination with cathartics, but as far as I am aware, it is new to prepare a bowel evacuant containing the constituents above referred to and in the physical condition set forth.

My bowel evacuant may be prepared as follows: Gelatine, agar-agar tragacanth or similar material is treated with water to form a syrupy or gelatinous mixture and then the ox gall is dispersed through this syrupy or gelatinous mixture. Tragacanth is soluble in cold water and, therefore, when using this material, it is not necessary to use heated water. However, when gelatine is used, it is necessary to heat the water, preferably to the boiling point, as gelatine is not soluble in cold water. The water and gelatinous dispersion of ox gall is then added to glycerine. If tragacanth is used as a gelatinous material, it is not necessary to heat the glycerine previous to mixing with the ox gall dispersion. However, if gelatine is used, it is necessary to heat the glycerine. I have found that when the glycerine is heated to a temperature of 95° C. satisfactory results are obtained. Thereafter the mixture of water, the gelatinous dispersion of ox gall, and glycerine is well agitated in any suitable type of mixing apparatus in order to produce a semi-liquid or syrupy composition.

As stated, the best results have been obtained by using a mixture in which the glycerine is present in a predominating quantity. In general, it may be stated that with glycerine present in a predominating quantity, the other constituents of the bowel evacuant may be present in substantially equal proportions, although, of course, this may be varied as desired. Specifically, the preferred proportions which have given the most satisfactory results are as follows:

| | Per cent. |
|---|---|
| Glycerine | 94 |
| Ox gall | 2 |
| Water | 2 |
| Gelatine | 2 |

The thinning agent referred to is preferably water and this appears to give better results than any other thinning agent.

In general, it may be stated that the glycerine may vary between 50% and 94%; the ox gall between 15% and 2%; the thickening agent between 10% and 2%; and the thinning agent between 25% and 2%.

It is to be noted that my bowel evacuant, in its preferred form, contains both a gelatinous thickening agent and a thinning agent, such as water, in addition to a predominating proportion of glycerine, and ox gall. The quick and thorough mechanical action of the evacuant or injection is in no small measure due to the presence of these constituents whereby a syrupy liquid is formed. I do not desire to be limited as to the theory of the reactions occurring but I simply state as a fact that my bowel evacuant functions immeasurably better than those heretofore known containing ox gall. It is to be noted that glycerine is present in a predominating proportion and ox gall in only a minor proportion. I am aware that it has been proposed to mix ox gall, glycerine, salicylic acid and water, to form a so called glycerite of ox gall, but in this preparation the ox gall is present in greater proportion than the glycerine. I have not followed the teaching of those skilled in the art but have broken away from the line of thought presented by those skilled workers and have prepared a composition in which the glycerine is present in a predominating quantity.

I claim:

1. A bowel evacuant for rectal injection consisting of glycerine in a predominating quantity, ox gall, a thickening agent, and a liquid adapted to thin the mixture to a semi-liquid or syrupy state.

2. A jelly-like bowel evacuant for rectal injection consisting of ox gall and a thickening agent, and glycerine in a predominating quantity.

3. A bowel evacuant for rectal injection consisting of over 90% glycerine, together with ox gall, a thickening agent and a liquid adapted to thin the mixture to a semi-liquid or syrupy state.

4. A bowel evacuant for rectal injection consisting of over 90% glycerine, together with ox gall, a gelatinous agent and a liquid adapted to thin the mixture to a semi-liquid or syrupy state.

5. A bowel evacuant for rectal injection consisting mainly of glycerine; and substantially equal proportions of ox gall, a thickening agent and a liquid adapted to thin the mixture.

6. A process of producing a bowel evacuant for rectal injection comprising dissolving a gelatinous thickening agent in water, dispersing ox gall therein, and adding the resulting mixture to glycerine to form a semi-liquid or syrupy mass.

In testimony whereof I hereunto affix my signature.

LEON BARON.